United States Patent [19]

Chronerberry

[11] 4,209,769

[45] Jun. 24, 1980

[54] SYSTEM FOR PRODUCING WARNING SIGNALS PERCEIVABLE BY AN AUTOMOBILE DRIVER IN RESPONSE TO REMOTE WARNING SOUNDS

[76] Inventor: Jack E. Chronerberry, 4101 E. Fanfol Dr., Phoenix, Ariz. 85028

[21] Appl. No.: 951,722

[22] Filed: Oct. 16, 1978

[51] Int. Cl.² .............................................. G08G 1/00
[52] U.S. Cl. ........................................ 340/34; 340/32
[58] Field of Search ................... 340/31 R, 32, 33, 34, 340/558–560, 1; 179/1 VE

[56] References Cited

U.S. PATENT DOCUMENTS

| 2,545,218 | 3/1951 | Weber et al. | 340/34 |
|---|---|---|---|
| 3,430,195 | 2/1969 | Castlen | 340/34 |
| 3,568,144 | 3/1971 | Streb | 340/34 |
| 3,626,365 | 12/1971 | Press et al. | 340/34 |
| 3,735,342 | 5/1973 | Helliker et al. | 340/34 |
| 3,859,623 | 1/1975 | Koehler | 340/34 |

Primary Examiner—John W. Caldwell, Sr.
Assistant Examiner—James J. Groody
Attorney, Agent, or Firm—Cahill, Sutton & Thomas

[57] ABSTRACT

A system for receiving remote warning sounds reflected from a roadway surface supporting an automobile includes a sound transducer mounted in the underside of a fender well of the vehicle for producing an audio frequency electrical signal in response to the received reflected warning sounds. The system includes an audio amplifier connected to the sound transducer for amplifying the audio frequency signal. The output of the audio amplifier is connected to inputs of a plurality of tone decoder circuits. Each tone decoder circuit is responsive to an audio frequency signal in a predetermined frequency band. The frequency bands of the plurality of tone decoder circuits are mutually exclusive. Each tone decoder circuit produces an output signal having a first logic level if an electrical signal having a frequency within its frequency range is received from the audio amplifier and a second logic level if no such electrical signal is received. If any of the tone decoders receive an input signal within their respective ranges, a warning light visible to the automobile driver is turned on and a second sound transducer is activated to produce warning sound audible to the automobile driver.

10 Claims, 3 Drawing Figures

SYSTEM FOR PRODUCING WARNING SIGNALS PERCEIVABLE BY AN AUTOMOBILE DRIVER IN RESPONSE TO REMOTE WARNING SOUNDS

BACKGROUND OF THE INVENTION

1. Field of the Invention

The invention relates to system for use in a sound repressive vehicle for giving an interior indication of the presence of remote warning sounds emitted by emergency vehicle sirens, horns and the like, and more particularly, to systems which are responsive to warning sounds reflected from a roadway supporting the vehicle in which the system is installed.

2. Description of the Prior Art

Under modern traffic conditions, and especially in cities with highly congested freeways and streets, wherein high population density inevitably gives rise to frequent emergency events which require summoning of emergency vehicles, including police vehicles, ambulances, fire engines and the like, it is necessary that automobile drivers become aware of the presence of such emergency vehicles as soon as possible. However, modern automobiles are frequently operated with the windows rolled up and with radios operating, so that the vehicle driver often does not hear the sirens of emergency vehicles until the emergency vehicle is very close. At this point, a driver is frequently unable to safely pull over to the side of the road or otherwise move out of the path of the emergency vehicle. Unnecessary delays to emergency vehicles and unnecessary additional accidents are frequently caused by the unawareness of an automobile driver of the presence of an approaching emergency vehicle. The presence of loud external sounds, such as traffic noise produced by the exhausts of diesel trucks and busses and the like further aggravates the problem of early awareness of approaching emergency vehicles. Further, many persons who are legally permitted to drive are nevertheless relatively hard of hearing, and may not hear emergency vehicle sirens sufficiently early to insure complete safety of all parties concerned.

Various attempts have been made to ensure that the driver of a vehicle be alerted to the existence of such external warning sounds. Such systems are generally referred to hereinafter as siren alert systems, even though the warning sounds may be produced by a horn, whistle, warbling device, or the like. Some of the prior siren alert systems have included specialized transmitters located in the emergency vehicle, which transmitters are activated when a siren is activated. However, such systems require specialized receivers located in other vehicles. This state of the art for this type of siren alert system or emergency vehicle alert system is set forth in U.S. Pat. Nos. 3,760,349, 3,233,217, 3,784,970, 4,013,994 and 3,673,560. However, this is an undesirably expensive technique which involves costly transmitters to be installed in all emergency vehicles and expensive receivers to be installed in all vehicles desired to be alerted to the presence of emergency vehicles.

Other siren alert system have incorporated sound transducers such as microphones directionally oriented to detect warning sirens from emergency vehicles to indicate not only the presence, but also the direction from which the emergency vehicle approaches. U.S. Pat. No. 3,626,365 discloses such a system; however, this system is a very complex system, and is therefore unduly expensive. The system described in U.S. Pat. No. 3,626,365 utilizes filter amplifiers which are responsive to signals in the range of approximately 1200 hertz to 8000 hertz. This system is unduly responsive to noises other than those produced by warning sirens, and may cause confusion by indicating the presence of an emergency vehicle when no emergency vehicle is actually near by. U.S. Pat. No. 3,867,719 discloses a siren alert system which provides high selectivity by providing a transducer means tuned to approximately 500 hertz, and operates on the basis of detecting doppler shifts to indicate presence of an amergency vehicle moving rapidly toward the vehicle at which the siren alert system is installed. However, this system is not capable of detecting presence of sirens and the like having no substantial frequency components of approximately 500 hertz. The latter system is complex, and is therefore more costly and less reliable than would be desired.

In different localities of the country, and also in different countries of the world, various sirens or siren-like sound warning devices are common, including single frequency sirens, warbling sirens, air horns, electric horns, and the like. It is highly desirable that a siren alert system be capable of detecting presence of the majority of known types of sirens and sound warning devices, and yet be unresponsive to the numerous other types of noises received by a vehicle, such as traffic noises.

It is therefore an object of the invention to provide a relatively simple siren alert system which detects the presence of warning sounds emitted by a plurality of sirens and sound warning devices operating at a plurality of substantially different frequencies and yet is unresponsive to commonly occurring traffic sounds.

It is another object of the invention to provide a siren alert system which is substantially less complex and costly than siren alert systems of the prior art.

SUMMARY OF THE INVENTION

Briefly described, and in accordance with one embodiment thereof, the invention provides a siren alert system for receiving warning sound waves transmitted by a remote emergency vehicle and reflected from a roadway surface supporting a vehicle in which the siren alert system is installed. The siren alert system includes a sound transducer mounted and oriented to receive the reflected warning sounds and produce an electrical audio frequency signal in response thereto. In a described embodiment of the invention, the sound transducer includes a ceramic microphone mounted in a fender well of the vehicle and oriented directly downward toward the roadway surface supporting the vehicle, so that reflected warning sounds received from all lateral directions are received and converted to the electrical audio frequency signals with approximately the same efficiency. An audio amplifier has its input coupled to the sound transducer output to amplify the electrical audio frequency signals. A plurality of tone detecting circuits have inputs coupled, respectively, to the output of the audio amplifier. Each tone detecting circuit includes circuitry which responds to a relatively narrow band of frequencies. A signal received within that band of frequencies causes the tone detecting circuit to produce a predetermined logic level signal at an output of the tone detecting circuit. The respective outputs of the plurality of tone detecting circuits are coupled to cause a warning indicator readily perceivable by the driver of the vehicle to be activated if the predetermined logic level signal appears at the output of any of the respective tone detecting circuits. The bands of frequencies of the respective tone detecting circuits are mutually exclusive. Therefore, the siren alert system responds to a plurality of different siren sound frequencies. In the described embodiment of the invention, the warning indicator includes both a warning light and an audio transducer, such as a speaker or buzzer, preset to emit a sound at a predetermined frequency and amplitude. Each of the tone detecting circuits include phase locked loop tone detecting circuitry responsive to a respective band of frequencies of approximately 500 hertz in width. The respective 500 hertz non-overlapping bands of frequencies are each centered about average warning sound frequencies produced by various common warning sirens, horns, and the like, which the siren alert system is designed to detect.

DESCRIPTION OF THE INVENTION

The siren alert system of the present invention is installed in ordinary automobiles and operated to alert the driver in response to warning sounds emitted by the siren or horn of a distant emergency vehicle to alert the driver of the automobile of the presence of the emergency vehicle even if the driver cannot hear the warning sounds due to high level of traffic noise, loud conversation or radio sounds in the automobile, or repression of outside sounds by rolled up windows of the automobile or noise generated by the automobile itself.

Figure 1:
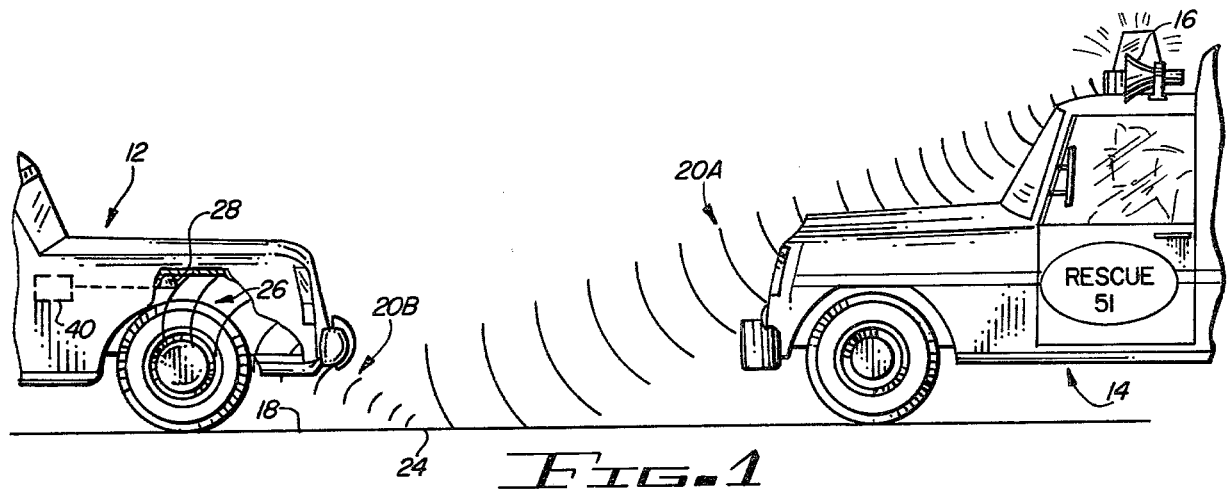
FIG. 1 is a diagram which illustrates one aspect of operation of the siren alert system of the present invention.

Referring to FIG. 1, automobile 12 and emergency vehicle 14 having a siren 16 thereon are supported by roadway surface 18. One aspect of the basic operation of the siren alert system of the invention is best understood by referring to the spherical sound "fronts," generally designated by reference numerals 20A and 20B in FIG. 1, representing sound waves emitted at a particular frequency by siren 16. The sound fronts 20A and 20B represent spherical surfaces having uniform amounts of transmitted or reflected sound energy per square unit traveling at the speed of sound away from siren 16 or reflection point 24 of roadway surface 18. The transmitted warning sound wave fronts 20A and 20B have portions thereof which strike the roadway surface 18 at various angles of incidence and are reflected at approxiamtely the respective angles of incidence. The wave fronts originating at siren 16 are designated by reference numeral 20A prior to reflection from roadway surface 18 and by reference numeral 20B after they are reflected.

Automobile 12 has a microphone 28 mounted in fender well 26. Microphone 28 is directed vertically downward to roadway surface 24 and "receives" oncoming reflected warning sound wave fronts 20B, but does not "receive" unreflected transmitted warning sound wave fronts 20A. Microphone 28 converts the received warning sound signals to electrical signals having amplitudes of the order of a few microvolts. This signal is processed by the circuitry of FIG. 3, described hereinafter.

Figure 2:
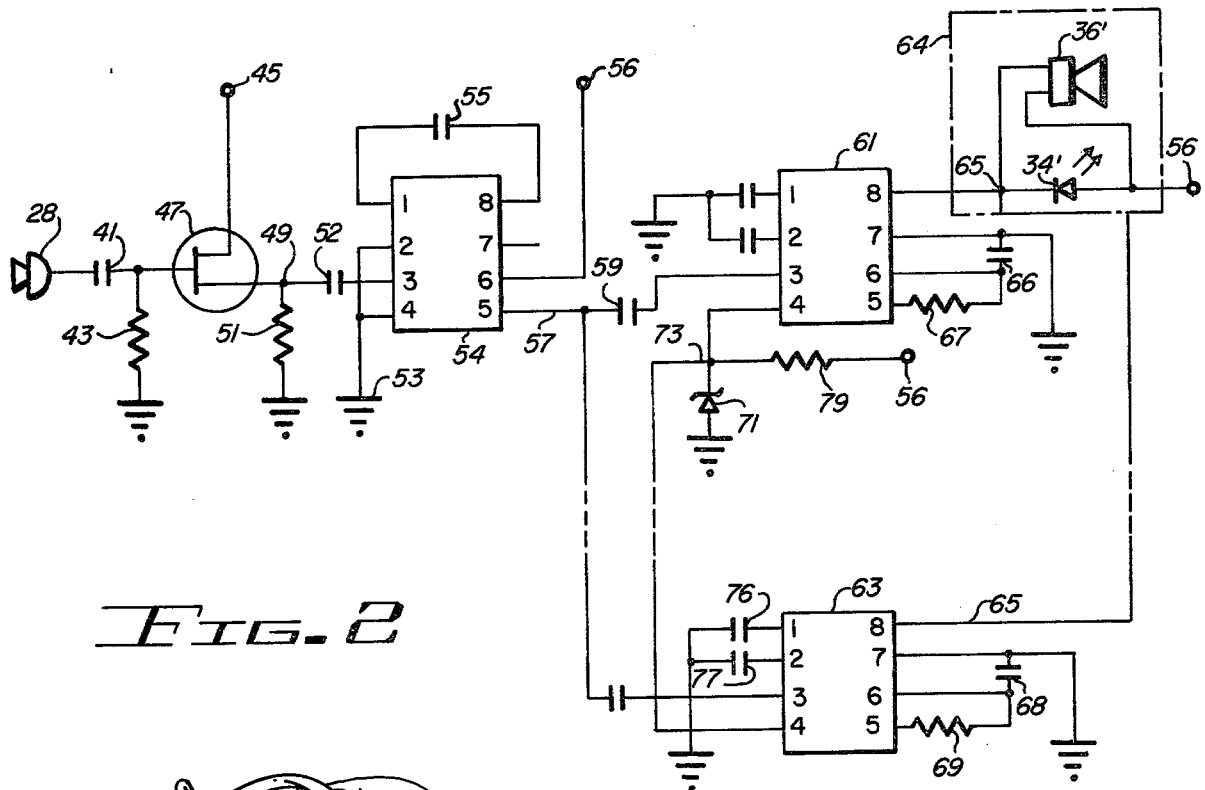
FIG. 2 is a partial illustration of a visual warning indicator and a buzzer mounted in the dashboard of a vehicle in which the siren alert system of the present invention is installed.

Referring now to FIG. 2, the dashboard of automobile 12 is shown. A speaker or buzzer 36 and a visual warning display 34 is responsive to siren alert circuitry 40 is mounted on dashboard 30 to provide both an audible and visual warning of the presence of the emergency vehicle 14 in the vicinity of automobile 12 even though the driver may be unable to actually hear sounds transmitted by siren 16 for the above mentioned reasons.

Figure 3:
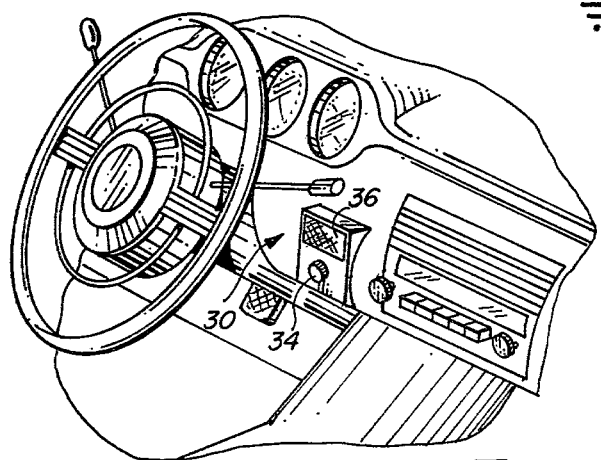
FIG. 3 is a schematic diagram of circuitry utilized to implement the described siren alert system.

Referring now to FIG. 3, circuitry 40 includes an audio amplifier 54 responsive to the above mentioned electrical signal produced by microphone 28. Circuitry 40 also includes a plurality of tone detectors or decoders 61 and 63, each of which detect or decode a predetermined narrow band of frequency components produced at the output of audio amplifier 54. A warning indicator system 64 alerts the automobile driver if any of the tone detectors 61, 63, etc. receive a frequency signal within their predetermined bandwidth.

The output of microphone 28 (which, as explained above, is mounted in the fender well 26 of automobile 12) is coupled by means of coupling capacitor 41 to the gate electrode of junction field effect transistor 47. Coupling capacitor 41 may have a capacitance of 0.1 microfarads. Resistor 43, which may have a resistance of one megohm, is also connected to gate electrode of junction field effect transistor 47 to discharge leakage current from the gate of junction field effect transistor 47 to ground conductor 53. Junction field effect transistor 47 may be a 2N3819 junction field effect transistor. The drain of junction field effect transistor 47 is connected to supply voltage conductor 45, which may be connected to a 9 volt DC voltage source. The source of junction field effect transistor 47 is connected to node 49, which is coupled to ground conductor 53 by means of source follower resistor 51, which may have a resistance of approximately 6.0 kilohms. Node 49 is coupled to an input of audio amplifier 54 by means of coupling capacitor 52, which may have a capacitance of 0.1 microfarads. Audio amplifier 54 can be an integrated circuit model NE386 audio amplifier, manufactured by National Semiconductor Corporation, or an equivalent device. Leads 1 and 8 of audio amplifier 54 are coupled by means of capacitor 55 in order to adjust the gain of audio amplifier 54. A 10 microfarad value of capacitor 55 has been found to provide suitable gain for audio amplifier 54. A 13.8 volt DC supply voltage applied to conductor 56 provides suitable operation of audio amplifier 54.

The output of audio amplifier 54 is connected to node 57, which is coupled by means of coupling capacitors 59 and 60 (which may each have a capacitance of 0.1 microfarads) to the inputs of tone detector or decoder circuits 61 and 63, respectively. Additional coupling capacitors (not shown) can be utilized to couple node 57 to the inputs of additional tone detector circuits (also not shown) to permit siren alert system circuitry 40 to monitor warning signals for a predetermined number of narrow frequency ranges corresponding to various different common sirens and warning sound devices.

Tone detector circuits 61 and 63 can be emplemented by means of integrated circuits referred to as model NE567 tone decoders, manufactured by National Semiconductor Corporation. However, various other tone detector or decoder circuits or notch filter circuits and appropriate logic circuitry could also be readily utilized by those skilled in the art to provide equivalent circuit functions.

Capacitors 74 and 74, which can have capacitances of 2 microfarads and 1 microfarad, respectively, couple input pins 1 and 2 of tone detector circuit 61 to ground conductor 54 in order to prevent unwanted oscillations. Similarly, corresponding capacitors 76 and 77 couple pins 1 and 2 of tone decoder circuit 63 to ground conductor 53. Supply voltage input pin 4 of tone decoder circuits 61 and 63 are connected to node 73, which is coupled to ground by means of 9 volt zener diode 71 and to supply voltage conductor 56 by means of 470 ohm resistor 79. Zener diode 71 provides a regulated supply voltage to tone decoder circuits 61 and 63 to protect them against damage if the integrated circuits are improperly plugged into printed circuit board sockets.

Tone detector circuits 61 and 63 each contain phase locked loop digital filter circuitry which is responsive to signals in an approximately 500 hertz band centered about frequencies determined by external components connected to the respective tone detector circuits. The 500 hertz pass band of tone detector 61 is established by the value of resistor 67 and the value of capacitor 66. Similarly, the pass band of tone detector 63 is determined by the values of capacitor 68 and resistor 69 connected as shown in FIG. 3.

The outputs of tone decoder circuits 61 and 63 produce a logical "one" (defined herein as the output voltage resulting when an output switch transistor (not shown) of the tone decoder circuits is saturated) on node 65 if either of tone decoder circuits 61 or 63 receives a signal within its respective pass band from audio amplifier 54. A logical "one" on node 65 activates warning circuitry 64, which is mounted on the dashboard of automobile 12 or on some convenient location readily perceivable by the driver of vehicle 12.

Thus, if a sound of a siren is received by microphone 28, a logical "one" is produced on node 65, which causes speaker 36' and light emitting diode 34' to be activated, thereby alerting the driver of the presence of the emergency vehicle whose siren emitted the received warning signals.

It should be noted that various controls and control circuitry responsive to the logical "one" signal produced on node 65 can readily be provided by those skilled in the art. The direct connection of speaker 36' and light emitting diode 34' to node 65 in FIG. 3 is merely schematically representative of audible and visual warning devices which can be readily provided by those skilled in the art. For example, an amplifier with tone control and volume control can be provided to drive speaker or buzzer 36'. Similarly, the visual warning display 34' could be a light emitting diode, as shown in FIG. 3, or could be any other type of suitable warning light or visual display.

The described embodiment of the invention has been implemented in a vehicle and has been found to be highly selective with respect to siren sounds emitted by warning vehicles. The system is not triggered by other sounds received by microphone 28, including road noise and traffic noise. Thus, there has been no need to provide any type of threshold circuitry between the output of microphone 28 and the inputs of tone detector circuitry 61, 63, although such threshold circuitry could be provided if deemed necessary.

While the invention has been described with reference to a particular embodiment thereof, variations in arrangement of the described elements and equivalents may readily be made within the true spirit and scope of the invention, which is set forth in the following claims.

I claim:

1. A system for detecting warning sounds external to a vehicle and producing a corresponding warning signal to a driver of a vehicle, said system comprising in combination:
   a. sound transducer means for receiving warning sound signals reflected from a roadway supporting said vehicle and producing an electrical audio frequency signal in response to said received warning sound signals, said sound transducer means being oriented downward to efficiently detect reflected warning sound signals approaching said vehicle from any lateral direction with respect to said vehicle while tending to block out detection of unreflected sound signals;
   b. audio amplifier means responsive to said audio frequency electrical signal for amplifying said audio frequency electrical signal;
   c. tone detector circuit means coupled to an output of said audio amplifier means for producing an output signal having a first level if the output signal produced by said audio amplifier is within a predetermined range of frequencies and a second level if said output of said audio amplifier means is not within said predetermined range of frequencies; and
   d. warning indicator means responsive to said tone detector circuit means for producing said warning signal in response to said first level, said warning signal being readily perceivable by the driver of said vehicle.

2. The system of claim 1 wherein said tone detector means includes a plurality of phase locked loop tone decoder circuits, each responsive to audio frequency electrical signals in a separate predetermined frequency range, said predetermined frequency ranges being mutually exclusive.

3. The system of claim 1 wherein each of said frequency ranges is approximately 500 hertz in width.

4. The system of claim 3 wherein said frequency ranges lie within the range of frequencies from approximately 1000 hertz to approximately 3500 hertz.

5. The system of claim 1 wherein said sound transducer means includes a ceramic microphone oriented vertically downward toward said roadway, whereby said ceramic microphone is approximately equally responsive to reflected warning sound waves approaching said vehicle from any lateral direction with respect to said vehicle.

6. The system of claim 1 wherein said warning indicator means includes a warning light mounted in the driver's compartment of said vehicle, said warning light being lit when a warning sound having a frequency in one of said frequency ranges is received by said transducer sensing means.

7. The system of claim 1 wherein said warning indicator means includes an audio transducer for producing a characteristic audio frequency signal when said tone detecting means produces said first level.

8. The system of claim 7 wherein said audio amplifier means includes an integrated circuit audio amplifier.

9. The system of claim 2 wherein said phase locked loop tone decoder circuits are integrated circuits.

10. The system of claim 1 wherein said sound transducer means includes a microphone mounted at the top of a fender cavity of the vehicle, the microphone being oriented approximately downward to efficiently detect ones of said reflected warning sound signals entering said fender cavity from the bottom opening of said fender cavity.

* * * * *